(12) United States Patent  
Schulte

(10) Patent No.: US 6,421,418 B1
(45) Date of Patent: Jul. 16, 2002

(54) METHOD AND SYSTEM FOR DETECTING HIDDEN EDGES

(75) Inventor: Robert L. Schulte, Gaithersburg, MD (US)

(73) Assignee: Northrop Grumman Corporation, Los Angeles, CA (US)

(*) Notice: Subject to any disclaimer, the term of this patent is extended or adjusted under 35 U.S.C. 154(b) by 0 days.

(21) Appl. No.: 09/640,042

(22) Filed: Aug. 15, 2000

(51) Int. Cl.[7] ............................................. G01J 23/203
(52) U.S. Cl. ........................... 378/89; 378/86; 702/172
(58) Field of Search ............................ 378/89, 86, 88, 378/70; 702/172

(56) References Cited

U.S. PATENT DOCUMENTS

| | | |
|---|---|---|
| 3,673,394 A | 6/1972 | Hartmann |
| 4,646,338 A | 2/1987 | Skillicorn |
| 4,839,808 A | 6/1989 | Koral et al. |
| 5,068,883 A | 11/1991 | DeHaan et al. |
| 5,125,017 A | 6/1992 | Lempriere .................. 378/86 |
| 5,195,116 A | 3/1993 | Le Floc'h et al. ............ 378/89 |
| 5,195,117 A | 3/1993 | Ong ............................ 378/89 |
| 5,237,598 A | 8/1993 | Albert |
| 5,351,203 A | 9/1994 | Hoffman et al. |
| 5,608,774 A | 3/1997 | Polichar et al. |
| 5,666,394 A | 9/1997 | Swanson ..................... 378/89 |
| 5,714,762 A | 2/1998 | Li et al. |
| 5,763,886 A | 6/1998 | Schulte ...................... 250/358 |
| 5,821,862 A | * 10/1998 | MacKenzie .................. 378/89 |
| 6,049,282 A | * 4/2000 | MacKenzie .................. 378/89 |

OTHER PUBLICATIONS

PCT International Search Report (PCT Rules 43 and 44) corresponding to International Application No. PCT/US 01/25916 filed Aug. 10, 2001.

* cited by examiner

*Primary Examiner*—Drew Dunn
(74) *Attorney, Agent, or Firm*—Baker Botts L.L.P.

(57) ABSTRACT

A system for detecting hidden edges is disclosed. The system comprises a workpiece having a surface and a hidden edge located below the surface. A radiation source moves along the workpiece surface and generates radiation. A radiation receiver moves along the workpiece surface and receives reflected radiation. A processor coupled to the radiation receiver determines a count rate of the reflected radiation, determines a change of the count rate corresponding to the hidden edge, and associates the change to a position on the workpiece surface. A method for detecting hidden edges is disclosed. Step one calls for providing a workpiece having a surface and a hidden edge located below the surface. Step two provides for directing radiation towards the workpiece surface with a radiation source. At step three, the method calls for receiving reflected radiation with a radiation receiver. Step four calls for determining a count rate of the reflected radiation and a change of the count rate with a processor, where the change corresponds to the hidden edge. The last step provides for associating the change of the count rate with a position on the workpiece surface.

20 Claims, 4 Drawing Sheets

METHOD AND SYSTEM FOR DETECTING HIDDEN EDGES

TECHNICAL FIELD OF THE INVENTION

This invention relates generally to the field of process measurement and more specifically to a method and system for detecting hidden edges.

BACKGROUND OF THE INVENTION

The importance of precise real-time measurements for the assembly and inspection of aircraft, buildings, and other structures has led to the demand for precision edge location systems. When assembling or inspecting a structure, one may need to know the location of the edge of a part, which may often be covered and not visible. Known methods for locating hidden edges, however, have not been satisfactory with respect to effectiveness, precision, and flexibility.

One known method for detecting edges uses feeler gauges. A feeler gauge measures the position of an edge by determining the position where the gauge comes in contact with the edge. A problem with the feeler gauge method is that it is time-consuming. To measure an edge, the feeler gauge is moved slowly to the edge and measures the edge. After measuring the edge, the feeler gauge is moved away from the edge and moved to the next edge to be measured. The feeler gauge cannot perform the measurements using one continuous movement. Additionally, since the feeler gauge must come into contact with the edge, the gauge cannot be used to detect hidden edges.

One known method for detecting hidden edges uses x-ray imaging. An emitter is placed at one surface of an object, and a detector is placed at the opposite surface to collect radiation that has passed through the object. The collected radiation forms an image of edges not visible from the surface. One problem with this method is that it requires access to opposite surfaces of an object, which is often not possible. Also, it is often difficult to place an emitter on one side of an object and a detector at the opposite side of the object. Additionally, developing a final image of the hidden edges may be a lengthy process. Another known method for detecting hidden edges uses eddy-current probes. An eddy-current probe detects changes in voltages as the probe is moved across an object with hidden edges. The voltage rises as the probe moves from a thinner region to a thicker region. A problem with this method is that it is not accurate. The voltage signal is affected by many factors that degrade the accuracy and precision of the probe, for example, the object's composition, thickness, and electrical properties. Additionally, the eddy-current probe can only detect hidden edges in conductive materials.

A backscatter gauge as described in U.S. Pat. No. 5,666,394 to Swanson may be used to measure the thickness of an object. To measure the thickness of an object, the backscatter gauge directs radiation towards the object, detects reflected radiation, and associates the reflected radiation with a thickness. A problem with this method is that the gauge requires the generation of calibration curves. The backscatter gauge must first determine the reflected radiation from an object of known thickness to generate calibration curves. The backscatter gauge then uses the calibration curves to determine the thickness of objects of unknown thickness.

While these devices and methods have provided a significant improvement over prior approaches, the challenges in the field of quality assurance has continued to increase with demands for more and better techniques having greater effectiveness, precision, and flexibility. Therefore, a need has arisen for a new method and system for detecting hidden edges.

SUMMARY OF THE INVENTION

In accordance with the present invention, a method and system for detecting hidden edges is provided that substantially eliminates or reduces disadvantages and problems associated with previously developed systems and methods.

According to one embodiment of the present invention, a system for detecting hidden edges is disclosed. The system comprises a workpiece having a surface and a hidden edge located below the surface. A radiation source moves along the workpiece surface and generates radiation. A radiation receiver moves along the workpiece surface and receives reflected radiation. A processor coupled to the radiation receiver determines a count rate of the reflected radiation, determines a change of the count rate corresponding to the hidden edge, and associates the change to a position on the workpiece surface. More specifically, the processor determines a position of a centroid associated with the change of the count rate, and the position of the centroid corresponds to the position on the workpiece surface.

According to one embodiment of the present invention, a method for detecting hidden edges is disclosed. Step one calls for providing a workpiece having a surface and a hidden edge located below the surface. Step two provides for directing radiation towards the workpiece surface with a radiation source. At step three, the method provides for receiving reflected radiation with a radiation receiver. Step four calls for determining a count rate of the reflected radiation and a change of the count rate with a processor, where the change corresponds to the hidden edge. The last step provides for associating the change of the count rate with a position on the workpiece surface. More specifically, the method calls for determining a position of a centroid associated with the change of the count rate, the position of the centroid corresponding to the position on the workpiece surface.

A technical advantage of the present invention is that it conveniently and effectively detects hidden edges. The system detects hidden edges by directing radiation towards an object with hidden edges, detecting the reflected radiation, and associating the reflected radiation with the position of the hidden edges. The system is compact and accesses only one surface of the object, and does not require contact with that surface. Another technical advantage of the present inventions is that it can detect hidden edges in different types of objects. The object to be measured may comprise a wide variety of materials, and does not need to be conductive. Additionally, the object may comprise different components, and may have air gaps in between the components. Another technical advantage of the present invention is that it provides real-time detection of hidden edges. The system only needs to perform a single scan proximate to the hidden edge to detect the hidden edge. In addition, the system does not require initial measurements to generate calibration curves in order to compute in real-time the location of the hidden edges. Consequently, the present invention allows for convenient and effective real-time detection of hidden edges in a variety of objects.

BRIEF DESCRIPTION OF THE DRAWINGS

For a more complete understanding of the present invention, and for further features and advantages, reference is now made to the following description, taken in conjunction with the accompanying drawings, in which.

DETAILED DESCRIPTION OF THE DRAWINGS

Figure 1:
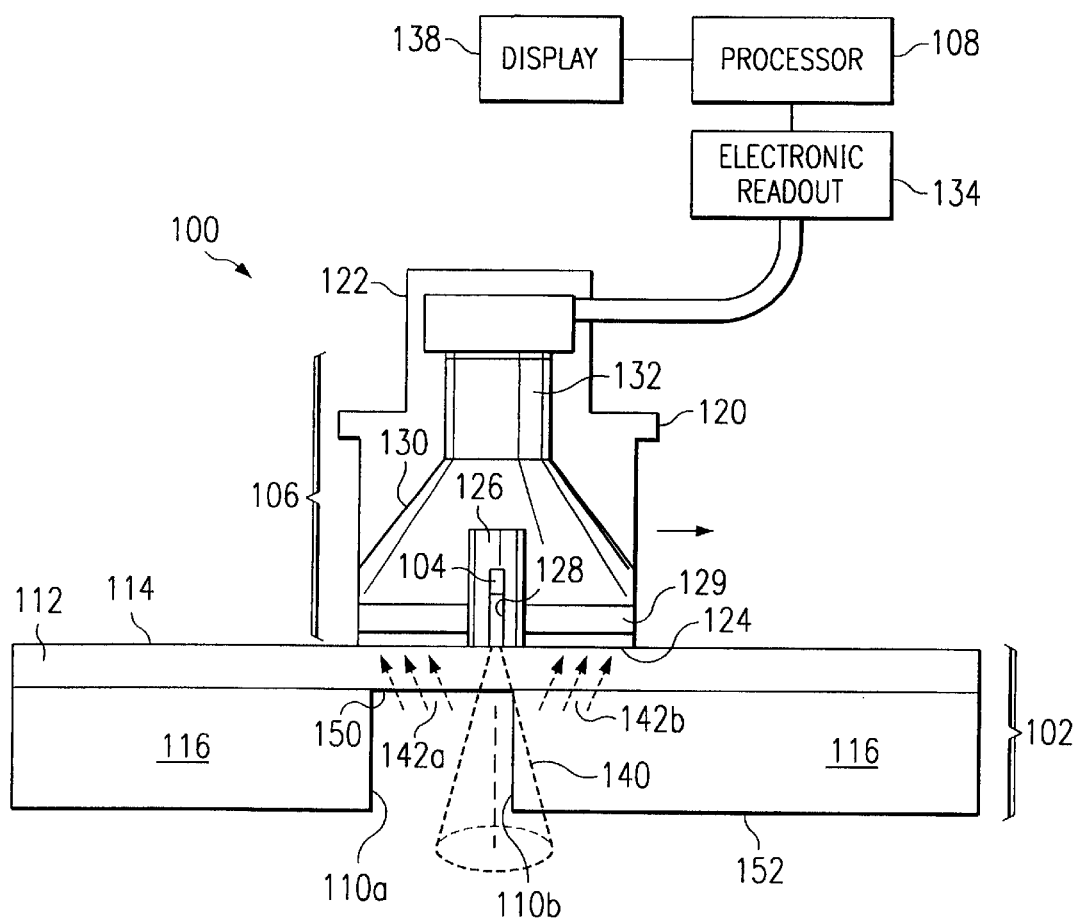
FIG. 1 illustrates one embodiment of a system for detecting hidden edges in accordance with the present invention.

FIG. 1 illustrates one embodiment of a system for detecting hidden edges in accordance with the present invention. System 100 includes a workpiece 102, a radiation source 104, a radiation receiver 106, and a processor 108. System 100 detects hidden edges 110a–b of workpiece 102 by generating radiation using radiation source 104, receiving the reflected radiation using radiation receiver 106, and determining changes in the reflected radiation and associating the changes to the position of hidden edges 110a–b using processor 108.

In this embodiment, workpiece 102 includes an outer structure 112 with a surface 114 and an inner structure 116 with edges 110a–b covered by outer structure 112. Edges 110a–b may be, for example, the edge of a workpiece component or the edges of a hole covered by an outer structure. Edges 110a–b may also be exposed and visible. Inner structure 116 does not need to be in contact with outer structure 112 for hidden edges 110a–b to be detected. Workpiece 102 may comprise any suitable material, for example, metals, composites, plastics, or combinations of these materials. Additionally, workpiece 102 may comprise different components, and may have air gaps in between the components. A backscatter gauge 120 may comprise a backscatter gauge as described in U.S. Pat. No. 5,666,394 to Swanson. In this embodiment, backscatter gauge 120 includes a housing 122 with a radiation-permeable housing floor 124. Housing floor 124 may comprise, for example, aluminum. A substantially cylindrical radiation shield 126 coupled to housing floor 124 is disposed such that the central axis of radiation shield 126 is proximate to the central axis of housing 122. Radiation shield 126 includes a collimation channel 128 that substantially terminates at the top surface of housing floor 124. Radiation source 104 is disposed within collimation channel 128. Radiation source 104 may comprise americium, cobalt, or any other suitable material capable of emitting radioactive particles. Radiation source 104 may emit radiation comprising, for example, x-rays or gamma rays.

In this embodiment, radiation receiver 106 comprises a radiation detector 129, a reducing light guide 130, and a light sensor 132. The central axis of radiation receiver may be proximate to the central axis of radiation shield 126. Radiation detector 129 is disposed outwardly from housing floor 124. Reducing light guide 130 is optically coupled to radiation detector 129, and directs light pulses from radiation detector 129 to light sensor 132. Reducing light guide 130 may comprise lucite or other light-transmitting material. Light sensor 132 is optically coupled to reducing light guide 130, and converts light pulses produced by radiation detector 129 to electrical signals. Light sensor 132 may comprise, for example, a photomultiplier tube or a photodiode. An electronic readout device 134 coupled to light sensor 132 receives the electrical signals from light sensor 132. Electronic readout device 134 may provide signal amplification and signal-level discrimination to furnish digital pulses for count-rate measuring circuitry. A processor 108 coupled to electronic readout device 134 receives data from electronic readout device 134. Processor 108 processes the data and displays the data on a display 138.

In operation, backscatter gauge 120 is positioned with respect to workpiece 102 with hidden edges 110a–b to be detected such that housing floor 124 is proximate to surface 114 of workpiece 102. Housing floor 124 does not need to be in contact with surface 114, and only requires access to one side of workpiece 102. Backscatter gauge 120 may be positioned manually by a user. Alternatively, gauge 120 may be coupled to a drill and positioned by automated positioning devices. Only a single sweep across the area proximate to edges 110a–b is needed to detect edges 110a–b. Radiation source 104 generates radiation. Collimation channel 128 of shield 126 collimates the radiation such that a collimated beam 140 passes through floor 124. Some of the incident rays of collimated beam 140 are absorbed by workpiece 102, and some of the rays are scattered in a generally backward direction as backscattered rays 142a–b. Backscattered rays 142a–b are detected by radiation detector 129 as they pass through housing floor 124. Reducing light guide 130 directs light pulses from radiation detector 129 to light sensor 132. Light sensor 132 converts the light pulses to electric signals, which are transmitted to electronic readout device 134. Electronic readout device 134 transmits the electric signals to processor 108. Processor 108 processes the data and displays the data on display 138, and may also store data. Processor 108 computes the location of the hidden edges from the electrical signals.

Figure 2A:
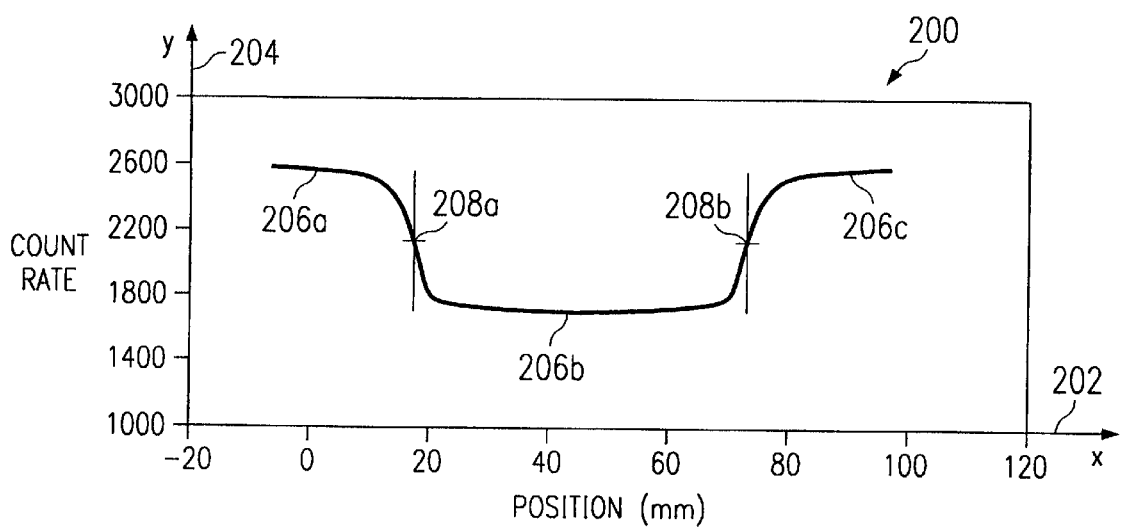
FIG. 2A is a two-dimensional graph illustrating measurements of the count rate of backscattered rays at a surface of a workpiece taken in accordance with one embodiment of the present invention.

FIG. 2A is a two-dimensional graph 200 illustrating measurements of the count rate of backscattered rays at surface 114 taken in accordance with one embodiment of the present invention. In general, a thicker material creates more backscattered rays than a thinner material. An x-axis 202 represents the position where the measurement of surface 114 is being taken. The position is measured in millimeters from an origin point of surface 114. A y-axis 204 represents the count rate of the backscattered rays detected by backscatter gauge 120 at surface 114. The count rate is measured in pulses per second. Data points 206a–c represent the count rate of backscattered rays 142a–b as backscatter gauge 120 moves from the origin point to 100 millimeters from the origin point in the x-direction on surface 114. According to data points 206a, the average count rate of measurements taken from 0 to 15 millimeters is approximately 2600, indicating that the workpiece 102 is of approximately uniform thickness between 0 to 15 millimeters. According to data points 206b, the average count rate from approximately 25–65 millimeters is approximately 1800, indicating that workpiece 102 is of approximately uniform thickness between 25–65 millimeters, and is thinner than between 0–15 millimeters. The change of count rates indicates that there is a change of thickness, or an edge, at approximately 20 millimeters.

To pinpoint the location of the edge, a centroid point 208a of data points 206a–b is calculated. The count rate of centroid 208a is calculated by taking the average of a high count rate and a low count rate, and then the position of centroid 208a, which indicates the position of the edge, is determined from data points 206a–b. The high count rate may be computed by, for example, taking the average of the count rates of data points 206a, which is approximately 2600. The low count rate may be calculated by, for example, taking the average of the count rates of data points 206b, which is approximately 1800. The count rate of centroid 208a is the average of the two count rates, which is approximately 2200. The position of centroid 208a may be interpolated from data points 206a–b using the count rate of centroid 208a. According to data points 206a–b, a data point with a count rate of 2200 is located at approximately 19 millimeters, which indicates that the edge is located under surface 114 at that position.

Similarly, the position of a centroid 208b may be computed to indicate the location of another hidden edge. The count rate of centroid 208b is calculated by taking the average of the high count rate of data points 206c and the low count rate of data points 206b. The high count rate may be computed from the average of data points 206c, which is approximately 2600. The low count rate may be computed from the average of data points 206b, which is approximately 1800. The count rate of centroid 208b is thus approximately 2200. The position of centroid 208b may be determined from the count rate of centroid 208b and data points 206b–c. According to data points 206b–c, centroid 208b is located at approximately 70 millimeters, indicating that there is a hidden edge under surface 114 at that position.

Figure 2B:
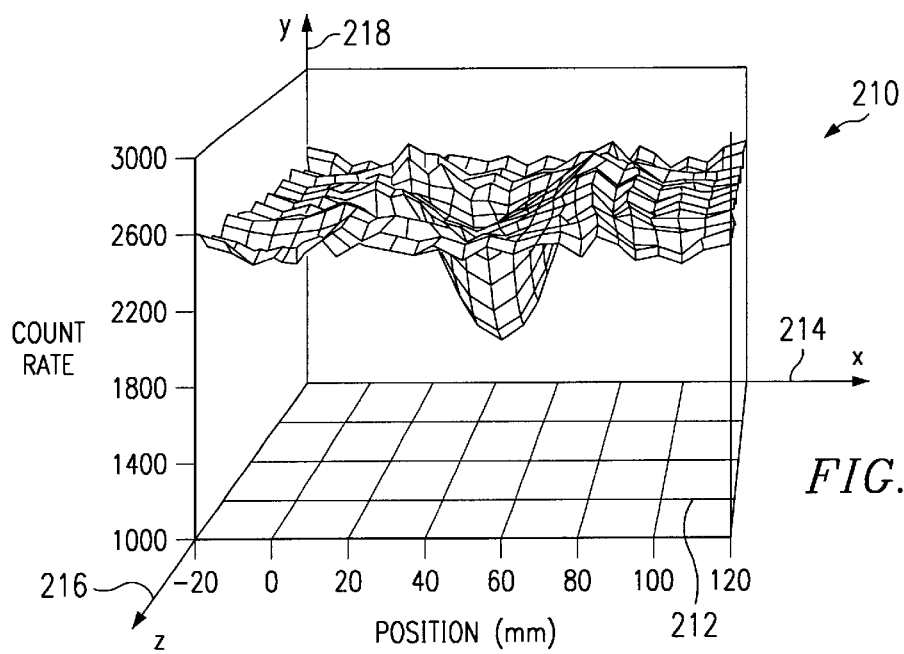
FIG. 2B is a three-dimensional graph illustrating measurements of the count rate of backscattered rays at a surface of a workpiece taken in accordance with one embodiment of the present invention.

FIG. 2B is a three-dimensional graph illustrating measurements of the count rate of backscattered rays at surface 114 taken in accordance with one embodiment of the present invention. An x-z plane 212 defined by an x-axis 214 and a z-axis 216 represents an area of surface 114. A y-axis 218 represents the count rates measured at the positions of the area represented by x-z plane 212. Graph 210 indicates that there is a hidden hole centered approximately at the location represented by x-z coordinate (50, 50).

Figure 3B:
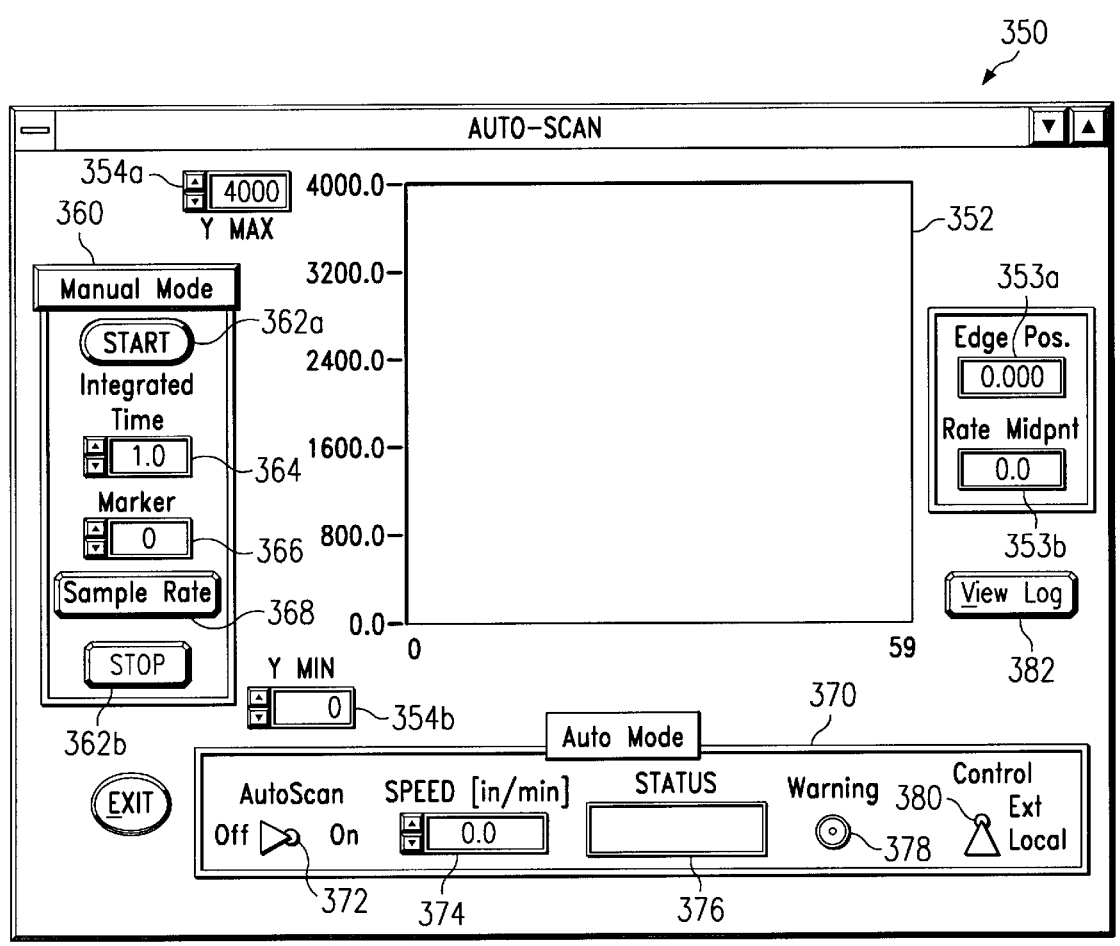
FIG. 3B illustrates one embodiment of a user interface that may be used with the system of FIG. 1 for detecting hidden edges in accordance with the present invention.
Figure 3A:
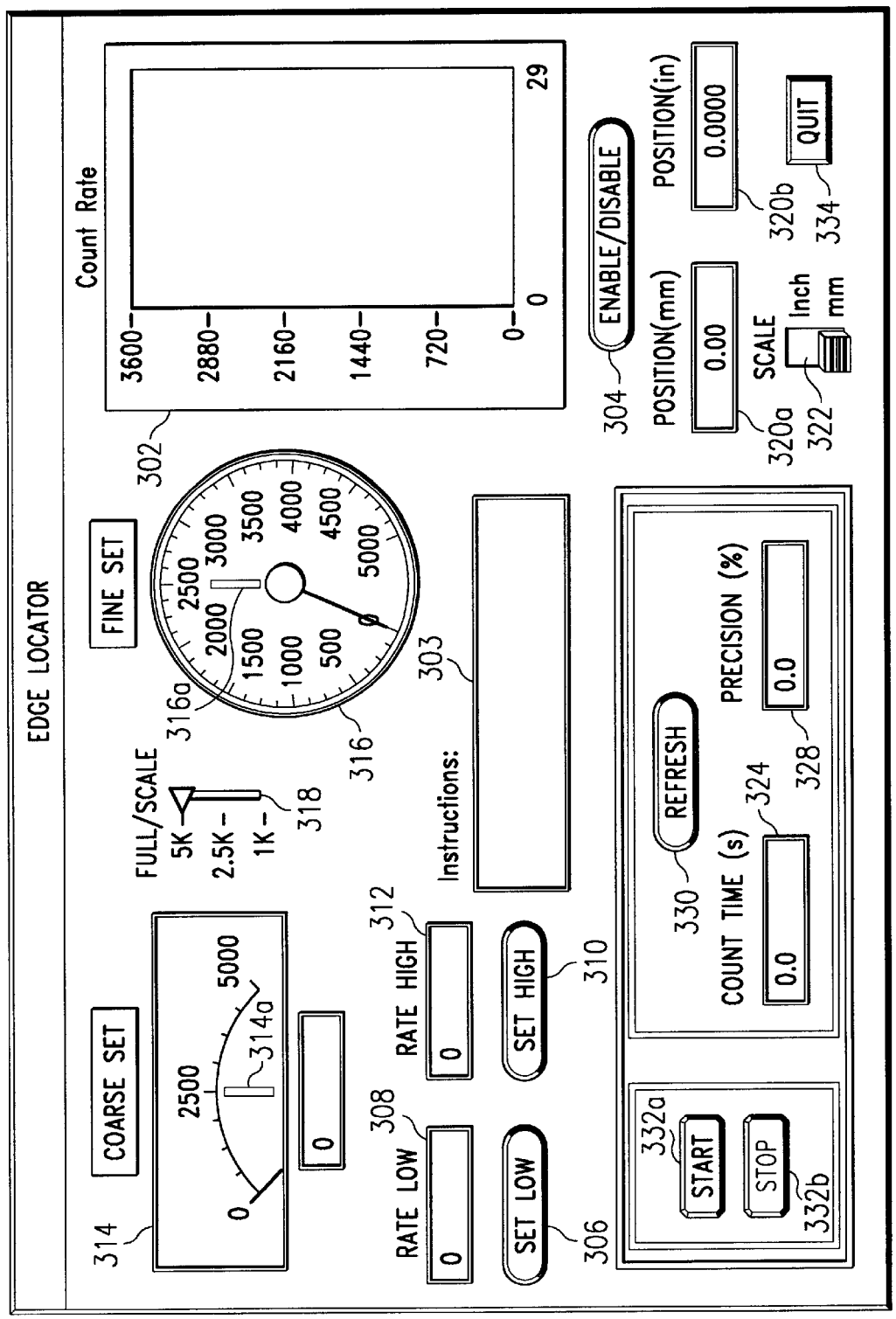
FIG. 3A illustrates one embodiment of a user interface that may be used with the system of FIG. 1 for manually detecting hidden edges in accordance with the present invention.

FIG. 3A is an illustration of one embodiment of a user interface 300 that may be used with system 100 for manually detecting hidden edges in accordance with the present invention. User interface 300 may be used with a hand-held version of backscatter gauge 120. In this embodiment, user interface 300 includes a window 302 that shows the count rate of the backscattered rays at surface 114 of workpiece 102. In one embodiment, the window may display, for example, a graph similar to the one discussed in connection with FIG. 2A. The graph may show centroid points to indicate the location of hidden edges.

An instruction window 303 displays instructions on how to use user interface 300 to manually detect hidden edges. An enable/disable button 304 allows the user to activate or deactive backscatter gauge 120. The user may set the count rate for a thin section 150 of workpiece 102 to be measured, which is displayed in a rate low window 308, using a set low button 306. The user may set the count rate for a thick section 152 of workpiece 102 to be measured, which is displayed in a rate high window 312, using a set high button 310. A coarse set meter 314 displays a rough estimate of the count rate being detected. A fine set meter 316 displays a more precise estimate of the count rate being measured. The user may initially set the maximum count rate of coarse set meter 314 and fine set meter 316 using a fall scale selector 318. In one embodiment, after rate low window 308 and rate high window 312 have been set, user interface 300 resets the scales of coarse set meter 314 and fine set meter 316 so that the count rate at the hidden edge corresponds to the center of coarse set meter 314 and fine set meter 316, as shown by indicators 314a and 316a. When the needles of meters 314 and 316 are both at indicators 314a and 316a, the gauge is positioned over an edge 110a–b.

Position windows 320a–b show the position in millimeters and inches, respectively, of surface 114 being measured. The user may switch the units of the position being measured using scale selector 322. A count time window 324 displays the length of time that has passed since the start of the measurement. A precision window 328 displays the precision of the measurements. The user may restart the count time clock 324 using refresh button 330. The user may start and stop the measuring process using start and stop buttons 332a–b, respectively. The user may quit the measuring process using a quit button 334.

FIG. 3B illustrates one embodiment of a user interface 350 that may be used with system 100 for detecting hidden edges in accordance with the present invention. User interface 350 includes a window 352 that displays the count rate at surface 114 workpiece 102. An edge position window 353a displays the position of a detected edge. A rate midpoint window 353b displays the count rate value at which the edge is located. The user may set the maximum count rate value using a Y max selector 354a and may select the minimum count rate using a Y min selector 354b. The maximum and minimum displayed count rate values may change during the measurement process to optimize the area of window 352 to show the graph of the count rate. User interface 350 includes a manual mode section 360 which displays controls for the operation of backscatter gauge 120 in the manual mode. The user may start and stop the measurement process using start and stop buttons 362. An integrated time selector 364 allows the user to select the time duration of each measurement. In general, a longer duration reduces the fluctuation of the measurement. The user may set the standard deviation range using a marker selector 366. A sample rate button 368 allows the user to take a measurement lasting for the time indicated in refresh time selector 364, or for a multiple of that time. The count rate is displayed in marker box 366.

User interface 350 also includes an automatic mode section 370 which includes the controls for operating backscatter gauge 120 in the automatic mode. The user may select to perform the measurement in either the manual mode or the automatic mode using an autoscan selector 372. If autoscan selector 372 is turned on, then the automatic mode is initiated when start button 362a is pressed. Otherwise, the manual mode is initiated. The user may view stored scan data by pressing a view log button 382. A speed selector 374 allows the user to set the speed at which backscatter gauge 120 scans surface 114. A status window 376 displays the progress of the measurement. Status window 376 may display, for example, the number of inches that have been scanned. A warning light 378 indicates that a possible error has occurred during scanning. A control selector 380 allows the user to set the control to external control if another system initiates the measurement, or to local control if the user is to initiate the measurement.

Figure 4:
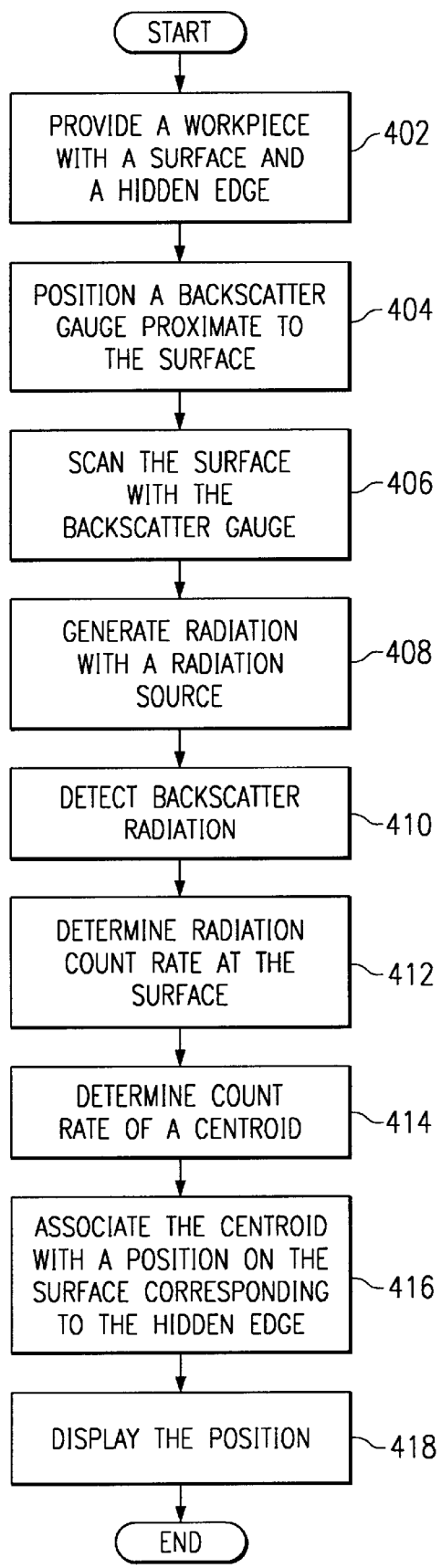
FIG. 4 is a flowchart illustrating one embodiment of a method for detecting hidden edges in accordance with the present invention.

FIG. 4 is a flowchart illustrating one embodiment of a method for detecting hidden edges in accordance with the present invention. The method detects the hidden edges of a workpiece by directing radiation toward the workpiece, detecting the reflected radiation, determining a change in the backscattered radiation, and associating the change to the position of a hidden edge. In this embodiment, the method starts at step 402, where workpiece 102 with surface 114 and hidden edges 110a–b is provided. Workpiece 102 may comprise any suitable material, for example, metals, composites, plastics, or combinations of these materials.

Additionally, workpiece 102 may comprise different components, and may have air gaps in between the components. At step 404, backscatter gauge 120 is positioned such that housing floor 124 is proximate to surface 114. Housing floor 124 does not need to be in contact with surface 114 and may be, for example, up to approximately one-half inch away from surface 114.

At step 406, backscatter gauge 120 scans surface 114 in one continuous motion. At step 408, which may be performed concurrently with step 406, radiation source 104 generates radiation. Collimation channel 128 collimates the radiation, resulting in a collimated beam 140 that passes through housing floor 124. Some of the incident rays of collimated beam 140 are absorbed by workpiece 102, and some of the rays are scattered in a generally backward direction as backscattered rays 142a–b. At step 410, backscattered rays 142a–b are received by radiation receiver 106. Radiation detector 129 produces light pulses as rays 142a–b strike detector 129. Reducing light guide 130 directs the light pulses from radiation detector 129 to light sensor 132. Light sensor 132 converts the light pulses to electrical pulses, which are transmitted to electronic readout device 134, which in turn transmits the electrical pulses to processor 108.

At step 412, the radiation count rate at surface 114 is determined. Processor 108 determines the count rate at surface 114. Two-dimensional graph 200, as described in connection with FIG. 2A, displays data points representing the count rate at surface 114 in real-time. Processor 108 may also filter the measurements to minimize unwanted deviations of the data points. Processor 108 may, for example, take the average of measurements taken at three successive times, $t_1$, $t_2$, and $t_3$, to yield a data point, then take the average of measurements taken at the next three successive times, $t_2$, $t_3$, $t_4$, to yield the next data point, and so on.

At step 414, the count rate of centroid 208 is calculated in real time. The count rate of centroid 208a is calculated by averaging the high count rate of data points 206a and the low count rate of data points 206b. The high count rate is approximately 2600, and the low count rate is approximately 1800. The count rate of centroid 208a is thus approximately 2200. At step 416, centroid 208a is associated with a position on surface 114. The position of centroid 208a may be determined from data points 206a–b using the count rate of centroid 208a. According to data points 206a–b, the position of centroid 208a is approximately 19 millimeters from the origin, indicating. that there is a hidden edge under surface 114 at approximately 19 millimeters from the origin point of surface 114. At step 418, the position of the edge is displayed. The position may be displayed on, for example, window 353a of user interface 350. The position may be transferred to another controller, such as a controller for a drilling operation via a serial port or other coupling device, and the method terminates.

Although an embodiment of the invention and its advantages are described in detail, a person skilled in the art could make various alternations, additions, and omissions without departing from the spirit and scope of the present invention as defined by the appended claims.

What is claimed is:

1. A system for detecting hidden edges, the system comprising:
    a) a workpiece having a surface and a hidden edge located below the surface;
    b) a radiation source operable to move along the workpiece surface and to generate radiation;
    c) a radiation receiver operable to move along the workpiece surface and to receive backscattered radiation; and
    d) a processor coupled to the radiation receiver and operable to determine a count rate of the backscattered radiation, to determine a change of the count rate corresponding to the hidden edge, and to associate the change to a position on the workpiece surface.

2. The system of claim 1, wherein the radiation receiver comprises a radiation detector operable to detect the backscattered radiation and to output light pulses associated with the backscattered radiation.

3. The system of claim 2, wherein the radiation comprises x-rays.

4. The system of claim 2, wherein the radiation receiver comprises a sensor operable to receive the light pulses and to convert the light pulses to electrical signals.

5. The system of claim 1 further comprising a collimation channel operable to collimate the radiation generated by the radiation source.

6. The system of claim 5, wherein the radiation detector has a central axis and the collimation channel has a central axis, the central axis of the radiation detector proximate to the central axis of the collimation channel.

7. The system of claim 1, wherein the processor is operable to determine a position of a centroid associated with the change of the count rate, the position of the centroid corresponding to the position on the workpiece surface.

8. The system of claim 7, wherein the change of the count rate is associated with a first count rate and a second count rate, and the processor is operable to calculate a count rate of the centroid from the first count rate and the second count rate and to determine the position of the centroid from the count rate of the centroid.

9. The system of claim 1, further comprising a display coupled to the processor and operable to display the position on the workpiece surface.

10. The system of claim 9, further comprising a user interface displayed on the display and operable to accept commands from a user to operate the processor.

11. A method for detecting hidden edges, the method comprising:
    a) providing a workpiece having a surface and a hidden edge located below the surface;
    b) directing radiation towards the workpiece surface with a radiation source;
    c) receiving backscattered radiation with a radiation receiver;
    d) determining a count rate of the backscattered radiation and a change of the count rate with a processor, the change corresponding to the hidden edge; and
    e) associating the change of the count rate with a position on the workpiece surface.

12. The method of claim 11, further comprising detecting the backscattered radiation with a radiation detector and outputting light pulses associated with the backscattered radiation.

13. The method of claim 12, wherein the radiation comprises x-rays.

14. The method of claim 12, further comprising receiving the light pulses from the radiation detector and converting the light pulses to electrical signals with a sensor.

15. The method of claim 11, further comprising collimating the radiation generated by the radiation source with a collimation channel.

16. The method of claim 15, wherein the radiation detector has a central axis and the collimation channel has a central axis, the central axis of the radiation detector proximate to the central axis of the collimation channel.

17. The method of claim 11, further comprising determining a position of a centroid associated with the change of the count rate, the position of the centroid corresponding to the position on the workpiece surface.

18. The method of claim 17, further comprising associating the change of the count rate with a first count rate and a second count rate, and calculating a count rate of the centroid from the first count rate and the second count rate, and determining the position of the centroid from the count rate of the centroid.

19. The method of claim 11, further comprising displaying the position on the workpiece surface with a display coupled to the processor.

20. The method of claim 19, further comprising displaying on the display a user interface operable to accept commands from a user to operate the processor.

* * * * *